UNITED STATES PATENT OFFICE 2,228,019

INDURATING COMPOSITION FOR CONCRETE OR MORTAR

Edward W. Scripture, Jr., Shaker Heights, Ohio

No Drawing. Application December 2, 1938, Serial No. 243,617

12 Claims. (Cl. 106—27)

This invention relates to the plasticizing and waterproofing of hydraulic cement concrete or mortar, and has for its object to provide an indurating composition which will decrease the amount of water required, will increase the waterproof qualities and which will also improve the workability.

It is well known that the properties of concrete are influenced by the amount of water employed in the mix. A certain quantity of water is required in order that the cement, sand, gravel, or other ingredients of the mix can be properly mixed together so that the material will flow readily and can be worked satisfactorily, but it has been found that the water content of the mix should be kept as low as possible as the strength, density, watertightness, volume change, resistance to disintegration by freezing and thawing or by corrosion are reduced by an increase in the water content.

An object of this invention is to provide means whereby a concrete mix having a given degree of fluidity may be made which contains a substantially smaller proportion of water than has heretofore been required to produce concrete mixes of the same fluidity.

Another object of the invention is to provide an improved concrete which can be worked easily and readily, which shrinks but little in hardening and which when hardened is dense and impermeable.

A further object of the invention is to provide a plasticizing mixture or composition which can be added to a batch of concrete or the like as it is being mixed, or to one of the ingredients before the material is mixed, and which, when so added, will greatly increase the fluidity of the mix without impairing the strength of the concrete.

Other objects and features of the invention will be apparent from the following description.

A considerable number of chemical substances have been found effective for plasticizing various finely divided solid materials suspended in water. However, a plasticizing agent effective for plasticizing materials in one mixture may be relatively ineffective in another mixture. In the case of concrete mixes a considerable number of substances which have been identified as plasticizing agents for certain materials have been added to concrete mixes. Many of these substances, when present in a concrete mix, do not have sufficient plasticizing action to affect appreciably the fluidity of the mix, and others have distinctly deleterious effects on the concrete with respect either to strength or to the inclusion of excessive amounts of air in the concrete.

I have found that effective plasticizing action of concrete mixes may be obtained by the addition of small quantities of waste residue derived from the manufacture of beer or ale, and which contains plasticizing ingredients. Such waste may be added to concrete mixes in sufficient proportion to very materially increase the workability of the mix, and to substantially reduce the amount of water required without deleterious effects on the concrete. Suitable material for use in my invention may be obtained in the form of a suspension from beer or ale wort before fermentation takes place. In usual practice of making beer or ale, after the hop catkins are removed, as by straining, the hot wort is pumped or sprayed into receiving tanks, where the wort is aerated, cooled, and allowed to settle. The material which separates from the wort in these tanks constitutes a type of waste that is suitable. It may be obtained in considerable quantities at relatively low cost from either beer or ale. The chemical composition of the beer waste is highly complex but it may include glutins, coagulated proteins, albuminoids, the reaction products of hop tannins with protein, hop rosin, and various other compounds. It may also include some of the spent hops if it is not convenient to remove them.

In the preparation of concrete mixes according to my invention the sand-cement mortar may be mixed in the usual manner and the beer waste added after the mixing or at any stage of the mixing process or to any ingredient before the mixing. The addition of 0.15% of dried beer waste (based on the weight of the cement) will reduce the quantity of water required for a given consistency in a 1:3 sand-cement mortar by about 6% to 10% and will at the same time increase the strength of the hardened mortar as is shown by the following example:

EXAMPLE I

1:3 Cement-sand mortar

| | With 0.15% dried waste | Without addition |
|---|---|---|
| Water required for 1100 g. cement in c. c. | 520 | 550 |
| Compressive strength in lbs. per sq. in.: | | |
| 1 day | 1018 | 986 |
| 3 days | 3530 | 3372 |
| 7 days | 5280 | 5184 |
| 28 days | 6902 | 6806 |

Larger quantities of the waste will still further decrease the amount of water required to make a workable mortar, but quantities of the waste very much in excess of 0.3% of dried residue on the weight of the cement tend to retard the set of the cement and to decrease the rate of development of the strength of the concrete or mortar so that strengths at 3 and 7 days may be materially reduced and even the strength at 28 days may be materially decreased. This effect is illustrated by the following example:

EXAMPLE II

1:3 Cement-sand mortar

|  | With addition of dried waste | | | Without addition |
|---|---|---|---|---|
|  | 0.4% | 0.5% | 1.0% |  |
| Water required for 1100 g. cement c. c. | 500 | 490 | 470 | 550 |
| Compressive strength in lbs. per sq. in.: |  |  |  |  |
| 3 days | 2418 | 95 | 0 | 3372 |
| 7 days | 4358 | 604 | 127 | 5184 |
| 28 days | 6742 | 5662 | 860 | 6806 |

It will be seen that with the addition of 0.4% the strength is not greatly impaired, whereas with 0.5% the early strengths are very much lower and the strength at 28 days somewhat impaired. With 1% the strength at 3 days is completely destroyed and at 7 and 28 days is very low. But with increasing proportions of the waste the amount of water required for a workable mortar is steadily diminished, being a reduction of 9% with 0.4%, of 11% with 0.5% and of 14½% with 1%.

By mixing with or adding to the waste, in whatever form employed, a reagent which accelerates the set and promotes the rapid development of strength in concrete and mortar, the difficulty involved in the use of large quantities of the waste may be overcome in whole or in part. By adding sufficient accelerating agent to compensate for the retardation produced by the use of more than 0.3% of the waste or its equivalent, the advantage of increased reduction in water may be secured without the attendant decrease in compressive strength which would otherwise result. This is illustrated in the following example:

EXAMPLE III

1:3 Cement-sand mortar

|  | With 0.5% dried waste plus 0.5% calcium chloride | Without addition |
|---|---|---|
| Water required for 1100 g. cement in c. c. | 500 | 550 |
| Compressive strength in lbs. per sq. in.: |  |  |
| 3 days | 3734 | 3658 |
| 28 days | 5152 | 4421 |

It will be apparent from the example given that it is possible to secure the plasticizing effect of 0.5% of the waste without injurious effect on strength by the use of 0.5% calcium chloride. It is, of course, possible further to increase the rate of development of strength by the use of a larger proportion of accelerating agent.

A number of electrolytes and other compounds besides calcium chloride have an accelerating effect on the hardening of cement. Among such accelerators are the soluble metal chlorides, soluble metal silicates, alkali metal hydroxides, sodium aluminate, triethanolamine and other compounds which are well known in the art. These accelerators may be substituted for the calcium chloride in the composition.

While it is to be understood that there may be considerable variations in the proportions desirable for different mixes and for different purposes, and that the property of increasing fluidity is not restricted to the precise percentages herein stated, it has been found with respect to the waste residue, that this material may be added in proportions from 0.05% to 0.3% of the dried residue on the basis of the weight of the cement in the mix, and that when an accelerating agent is present the waste residue may be added in proportions up to .5%. The quantity of accelerating agent used depends on the proportion of waste residue, on the nature of the accelerating agent, and on the effect desired. With the larger proportions of waste residue greater quantities of accelerating agent should be used. From .02% to 2.5% of accelerator is usually sufficient to give the effect desired, and when calcium chloride is used as the accelerator it is usually best to use from .3% to 2.5%.

It will be apparent that the waste may be used either as a liquid in the form in which it is recovered from the manufacturing process, or as a more or less concentrated solution, or as the dried residue. If desired, the more active portions of the beer or ale waste may be separated from the less active or inert portions and utilized in making cement or mortar mixes. It is unnecessary to do this in that the small percentage calculated on the dry basis of the beer waste that is normally added to a cement mix is such that the less active or inert portions do not have a substantial deleterious effect on the mix.

The mix is prepared in the usual manner except for the addition of the waste with or without an accelerating agent. The completed mix because of the presence of the plasticizing agent is much more fluid and flows more readily than a similar mix prepared with the same quantity of water, but without the plasticizing agent. Because of the greater fluidity the mix is more readily workable and is more cohesive, thereby preventing segregation of aggregates in the mix.

Because of the increase in fluidity of the mix which is produced by the plasticizing agent provided by my invention, it is possible to reduce the amount of water employed in a mix and still produce a mix having a satisfactory degree of fluidity so as to be workable, and this reduction in the amount of water produces a concrete of increased density and impermeability. This invention also makes possible the use of leaner mixes, that is, mixtures having relatively smaller amounts of cement than usually employed. This results in a substantial saving and produces a concrete which shrinks less than those produced by the mixes now employed.

It is well known that in concrete made from locally available materials there is frequently a deficiency of fines in the aggregate so that the most desirable granulometric composition is not secured. Even with sand which is not deficient in fines it is often advantageous to add to concrete a small proportion of a non-hydraulic fine material, finer than the usual cement, as this promotes greater density and watertightness by filling and making smaller the capillaries which form in concrete. The addition of a fine pozzuolanic material has the advantages set forth above and, in addition, combines with and fixes the free lime either originally present in the cement or formed by hydrolysis of the compounds of the cement, rendering this lime less soluble, hence less subject to corrosive attack. A disadvantage, however, which has hitherto accompanied such addition of fines, either inert or pozzuolanic, is that, to secure the same slump, flow or workability of the concrete it has been necessary to add more water with the fines than would be required in a similar concrete mix without the fines. This has the disadvantage of decreasing density, watertightness and strength, and of increasing volume change.

By combining with this fine material a plasticizing agent, either with or without an accelerator, the disadvantages involved in the use of more water in the concrete mix with the fine material is avoided, and the quantity of water required in the mix may be even less than that required in ordinary mixes without fines. The increase in fluidity produced by the waste makes it possible to add substantial amounts of inert or pozzuolanic, finely divided non-hydraulic material with a reduction of water content of the mix. The plasticizing agent and the fine material may be prepared, with or without the accelerating agent, as a powder mixture to be added in suitable quantities to the ingredients of the concrete mix, or as a suspension of the finely divided solids in a solution of the plasticizing agent. Such finely divided materials as precipitator dust or fly ash, talc or the like, bauxite residue, trass, pumice, or diatomaceous earth may be used.

It will be obvious that other materials may be added to the concrete at the same time, as for example colors, stearate waterproofings, etc. These may be added separately to the concrete mix at the time of mixing or might be added to the composition of the present invention prior to the mixing of the concrete. It is also obvious that the composition of the present invention may be incorporated in other materials such as ground iron or other aggregates which are either added to the mix at the time of mixing or are incorporated in the mix after it has been placed, but before it has hardened by shaking onto the surface and working into the still plastic surface. It will also be obvious that the composition of the present invention may be added to the concrete when it is being mixed or to the water to be used in the mix, or to each sack of cement before the mix is made, or to the cement when it is ground, or, in fact to any part of the concrete mix prior to completion of the mixing. It will also be obvious that the usual addition of calcium sulphate as a retarder in cement may be omitted and replaced by the composition of the present invention using a quantity of the waste which retards the set of the cement.

From the foregoing it will be seen that I have provided a plasticizing agent which can readily be added to concrete or mortar mixes, and which substantially increases the fluidity or workability of the mix over that of a similar mix prepared without this agent.

It will be seen also that because of the increased workability produced by the composition of the present invention the quantity of water employed in the mix can be very substantially reduced, even if a considerable proportion of fines is added to the mix, thereby providing a superior concrete, while additional aggregates may be added to the mix without it becoming necessary to increase the water content of the mix as would otherwise be required. The composition of the present invention is inexpensive and very effective in concrete mixes for the purpose described, and is provided in a form convenient for addition to concrete mixes.

Furthermore, it is to be understood that the particular compounds disclosed and the procedure set forth are presented for purposes of illustration and explanation and that various equivalents can be used and modifications of said procedure can be made without departing from my invention as defined in the appended claims.

What I claim is:

1. An indurating composition for concrete or mortar comprising a waste residue obtained from the manufacture of beer or ale and containing plasticizing ingredients, and an accelerator which accelerates the hardening of the cement.

2. An indurating composition for concrete or mortar comprising a waste residue obtained from the manufacture of beer or ale and containing plasticizing ingredients, an accelerator which accelerates the hardening of the cement, and a finely divided non-hydraulic filling material.

3. An indurating composition for concrete or mortar comprising a waste residue obtained from the manufacture of beer or ale and containing plasticizing ingredients, and a small amount of calcium chloride.

4. A mortar or concrete mix comprising an hydraulic cement, aggregate, and a waste residue obtained from the manufacture of beer or ale and containing plasticizing ingredients.

5. A mortar or concrete mix comprising an hydraulic cement, aggregate, a waste residue obtained from the manufacture of beer or ale and containing plasticizing ingredients, and an accelerator which accelerates the hardening of the cement.

6. A mortar or concrete mix comprising an hydraulic cement, aggregate, a waste residue obtained from the manufacture of beer or ale and containing plasticizing ingredients, an accelerator which accelerates the hardening of the cement, and a finely divided non-hydraulic filling material.

7. A mortar or concrete mix comprising an hydraulic cement, aggregate, and a waste residue obtained from the manufacture of beer or ale and containing plasticizing ingredients, said waste residue being present in an amount of from .05% to .3% by weight of the cement.

8. A mortar or concrete mix comprising an hydraulic cement, aggregate, and a waste residue obtained from the manufacture of beer or ale and containing plasticizing ingredients, and an accelerator which accelerates the hardening of the cement, said waste residue being present in an amount of from .05% to .5% by weight of the cement, and said accelerator having a percentage of from .02% to 2.5%.

9. The method of increasing the workability of a concrete or mortar mix containing water at a given ratio which comprises incorporating in the mix the solids in a waste residue obtained from the manufacture of beer or ale and containing plasticizing ingredients and an accelerator, being one of a group of accelerating agents which includes water soluble metal chlorides.

10. The method of increasing the workability of a concrete or mortar mix containing water at a given ratio which comprises incorporating in the mix the solid constituents of a waste residue obtained from the manufacture of beer or ale and containing plasticizing ingredients in an amount of from .05% to .3% by weight of the cement.

11. The method of increasing the workability of a concrete or mortar mix containing water at a given ratio which comprises incorporating in the mix the solid constituents of a waste residue obtained from the manufacture of beer or ale and containing plasticizing ingredients in an amount of from .05% to .5% by weight of the cement, and an accelerator, being one of a group of accelerating agents which includes water soluble metal chlorides in an amount of from .02% to 2.5%.

12. A mortar or concrete mix comprising an hydraulic cement, aggregate, and a waste residue obtained from the wort of beer or ale.

EDWARD W. SCRIPTURE, JR.